(12) United States Patent
Ramakesavan

(10) Patent No.: US 6,184,781 B1
(45) Date of Patent: *Feb. 6, 2001

(54) REAR LOOKING VISION SYSTEM

(75) Inventor: Sundaram Ramakesavan, Chandler, AZ (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/243,040

(22) Filed: Feb. 2, 1999

(51) Int. Cl.$^7$ ........................................ B60Q 1/00
(52) U.S. Cl. .................. 340/435; 340/436; 340/461; 340/903; 348/118; 348/148
(58) Field of Search ........................ 340/435, 436, 340/461, 903, 937, 425.5, 36, 37, 38, 39; 348/118, 148, 149; 382/104, 107, 154, 105, 293, 294, 153

(56) References Cited

U.S. PATENT DOCUMENTS

| | | | |
|---|---|---|---|
| 4,713,685 | * 12/1987 | Nishimura et al. | 348/148 |
| 5,487,116 | * 1/1996 | Nakano et al. | 382/104 |
| 5,550,937 | * 8/1996 | Bell et al. | 382/293 |
| 5,657,073 | * 8/1997 | Henley | 348/38 |
| 5,670,935 | * 9/1997 | Schofield et al. | 340/461 |
| 5,793,308 | * 8/1998 | Rosinski et al. | 340/903 |
| 5,883,739 | * 3/1999 | Ashihara et al. | 348/118 |

\* cited by examiner

Primary Examiner—Jeffery A. Hofsass
Assistant Examiner—Van T. Trieu
(74) Attorney, Agent, or Firm—Trop, Pruner & Hu, P.C.

(57) ABSTRACT

A rear looking vision system for a vehicle may produce a composite image from images produced by different imaging devices having different viewing angles of the region behind the vehicle. The composite image may combine the images so as to avoid duplicating objects within the fields of view of more than one imaging device.

11 Claims, 8 Drawing Sheets

REAR LOOKING VISION SYSTEM

BACKGROUND

The invention relates to providing a rear looking image of the region behind a vehicle such as a car, truck, boat, train or plane.

When operating an automobile, it is awkward to attempt to use the images from both the side view and rearview mirrors to check the area to the rear of the operator. The operator may look behind the vehicle, but this too is awkward and may be dangerous since the operator is no longer watching the area in front of the car.

Thus, there is a need for a system that better enables an operator to be advised about hazards to the sides and rear of a vehicle.

SUMMARY

In accordance with one embodiment, a rearview system for a vehicle includes first and second imaging devices adapted to develop images of an area to the rear of a vehicle. A system combines the images from said first and second imaging devices together to form a composite image.

DETAILED DESCRIPTION

Figure 1:
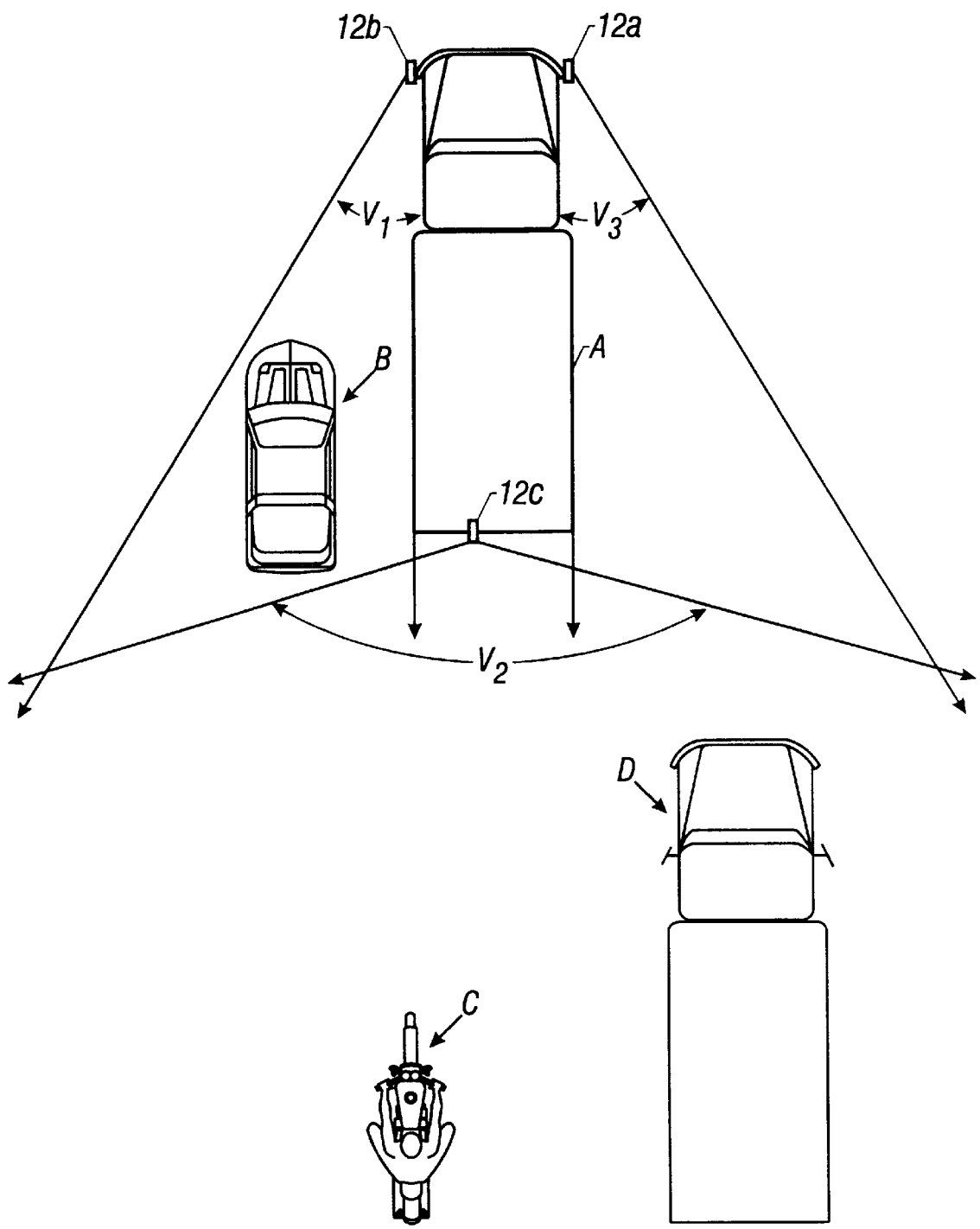
FIG. 1 is a diagrammatic top plan depiction of a vehicle with a rear looking vision system in accordance with one embodiment of the invention.

Referring to FIG. 1, a vehicle A (illustrated as being a flatbed truck but can also be a car, boat, train or plane or any other vehicle) is illustrated as moving down a roadway along a vehicle B (illustrated as a car), and ahead of a vehicle C (illustrated as a motorcycle) and a vehicle D (a tractor trailer truck). The vehicle A is equipped with three rear looking cameras 12a–12c which may be digital cameras. The cameras 12a and 12b are illustrated in position at the front corners of the vehicle while the camera 12c is located on the rear of the vehicle. The viewing angle of each of the cameras is illustrated by the arrows V1, V2 and V3.

Figure 2A:
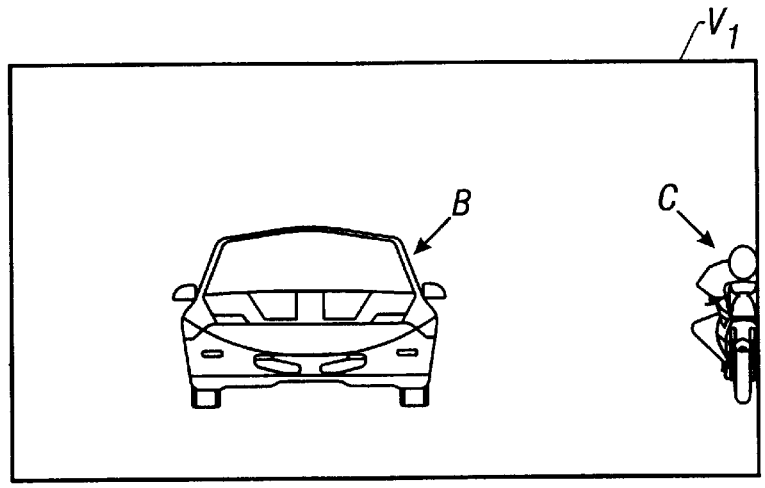
FIGS. 2A–2C are depictions of exemplary frames from each of the three cameras shown in FIG. 1.
Figure 2B:
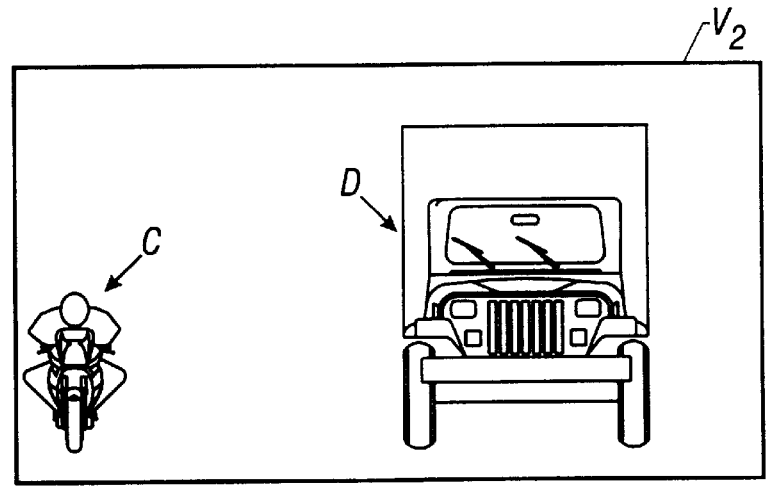
Figure 2C:
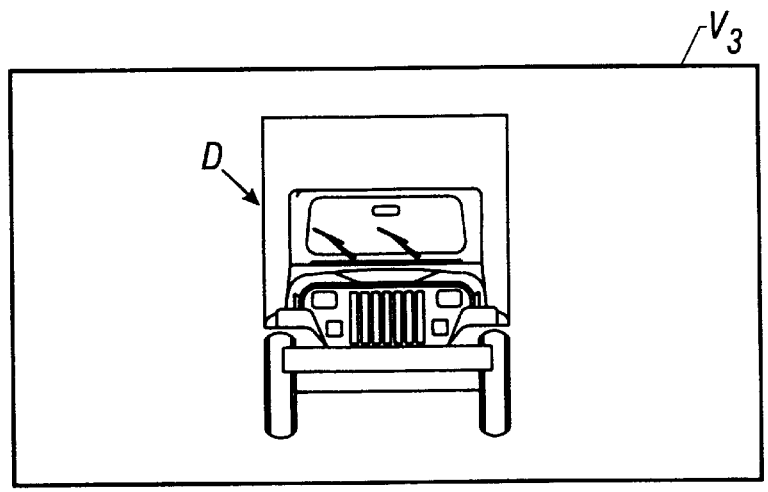

Thus, each camera has a different field of view and images a different scene behind or on the side of the vehicle. For example, referring to FIGS. 2A–2C, the view V1 from the camera 12b may include the vehicle B and part of the vehicle C, as illustrated in FIG. 2A. The view from camera 12c, V2, includes the vehicle C and the vehicle D, as shown in FIG. 2B. The view from the camera 12a, shown in FIG. 2C, includes only the vehicle D.

Figure 3:
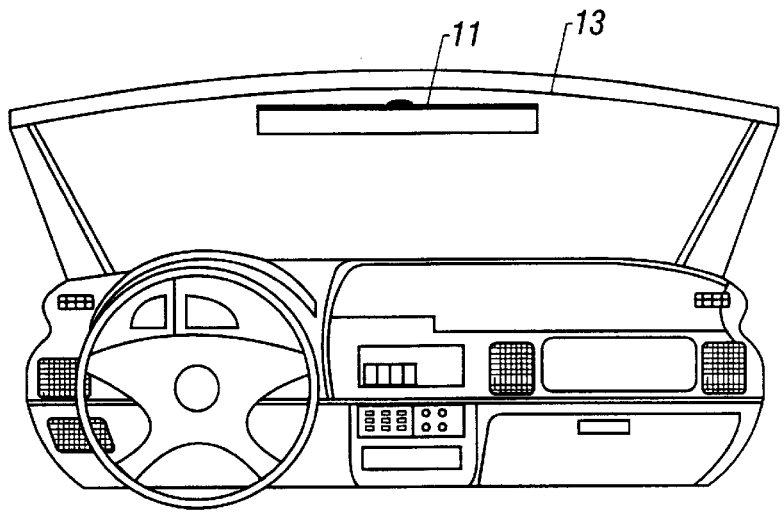
FIG. 3 is a front elevational view of the cab of the vehicle, shown in FIG. 1 with a rear-looking vision system, showing the view from the operator's perspective.
Figure 4:
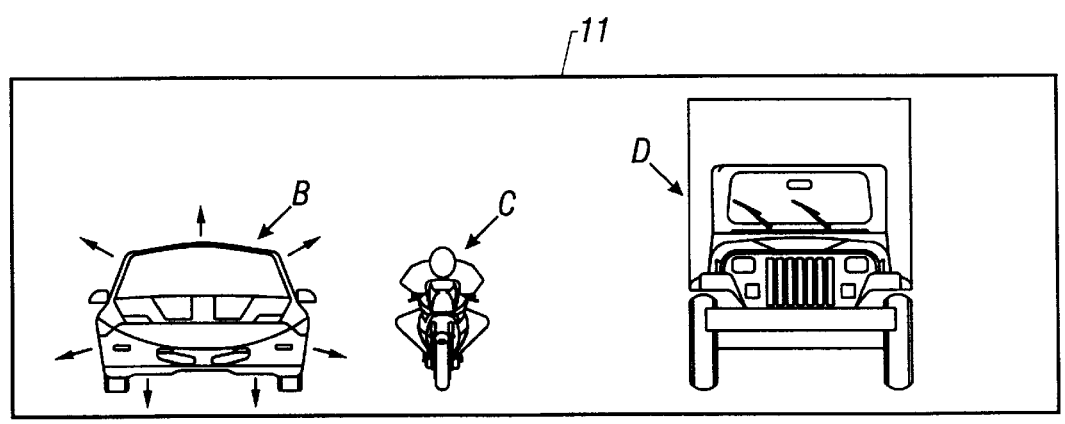
FIG. 4 is the resulting depiction on the rearview display device in one embodiment.

A display 11 (shown in FIG. 3), mounted in the position normally occupied by a rearview mirror in the front of the vehicle cab 13, may display the images produced from the three illustrated cameras 12 as adjusted (as will be described hereinafter) to reduce misalignment problems and distortions arising from stitching the three images together. Namely, as shown in FIG. 4, the display 11 displays an image which corresponds to what the operator would have seen if the operator had turned around and was able to view the scene behind the vehicle fully. Namely, the three vehicles B, C and D are shown in their appropriate positions, adjusted for distance behind the vehicle and for lateral displacement with respect to one another. In this way, the operator gets a full view of what is going on behind the vehicle. Moreover, in one embodiment of the invention, the operator may see a full view of the sides of the vehicle and the entire scene is stitched together so that with one glance to the display device 11, the operator can fully appreciate everything that is going on around the vehicle, as if the cameras were effectively looking right through the vehicle A. The image of vehicle B may be caused to flash (as indicated by the arrows) to indicate it is alongside the vehicle A.

Figure 5:
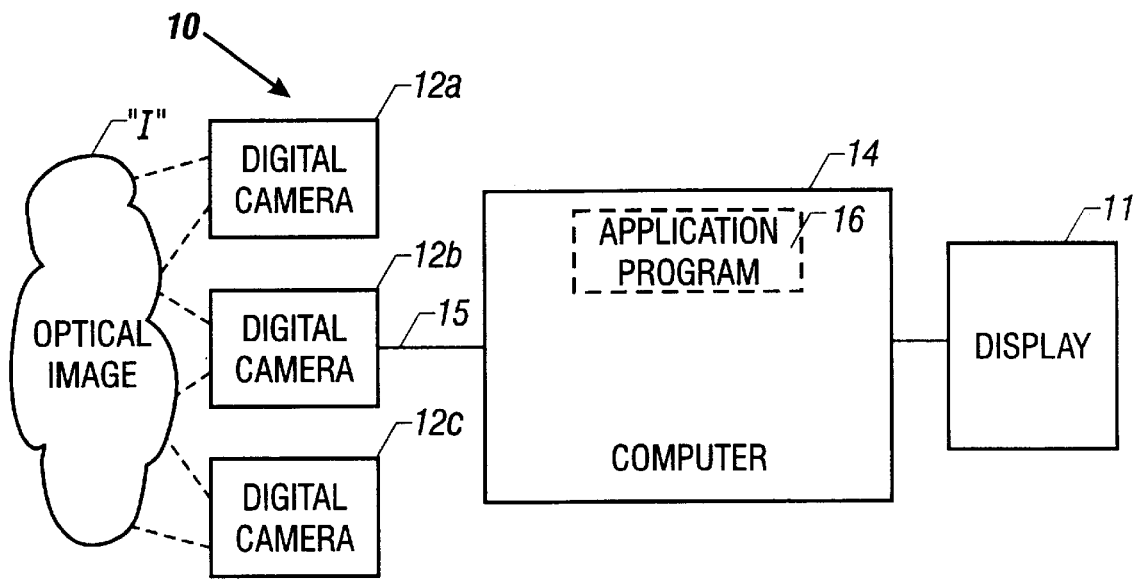
FIG. 5 is a block diagram of a digital imaging system that runs an application program according to an embodiment of the invention.

Referring to FIG. 5, a digital imaging system 10, which may be located in the vehicle A, includes a program 16, according to an embodiment of the invention, and one or more digital cameras or other suitable imaging devices 12 (which may be a video camera or still-shot camera) that captures multiple optical images "I". Each camera 12 transmits streams of data representing the images (stored as frames of pixel data) to a computer 14 over a communications link 15 (which may be a serial link, for example). The computer 14 may then execute the application program 16 to process the captured images. According to an embodiment of the invention, under control of the application program 16, the computer 14 can combine ("stitch") multiple frames of digitized images together to form a composite image to represent the overall scene on the side of and behind the vehicle A.

The captured images are then processed and stitched together by the application program 16 ("stitching program"), according to embodiments of the invention, to create a composite image that represents the entire scene behind the vehicle. Key parts of the stitching process include aligning the captured frames and matching overlapping regions of the different frames of the scene. To accurately match the regions in the multiple images, the stitching program 16 may compensate for misalignment or distortion resulting from motion of the cameras caused, for example, by movement of the vehicle.

There are six degrees of freedom of motion of each camera, these being the three independent axes of motion (x,y,z) and the three independent rotations about those axes. Thus, given any two overlapping images about which nothing is known regarding the relative positions of the camera when capturing two images, the six-dimensional space is searched to match the overlapping pixels of two images.

Because the cameras 12a–12c are relatively fixed to each other, except for perhaps vibration caused by movement of the vehicle A, the regions of overlap between images $I_1$ and $I_2$ (captured by cameras 12b and 12c, respectively) and between $I_2$ and $I_3$ (captured by cameras 12c and 12a, respectively) are roughly in the same areas. To properly combine or stitch the frames of images, all the captured frames may be aligned with respect to a reference frame to compensate for movement and rotation of the camera 12 caused by vibrations, for example, as a target scene is being captured. The reference frame may be selected as the frame captured by camera 12c. This correction process ("alignment process") is accomplished using perspective transforms (or projective mapping) to adjust the pixel positions in each frame. In one embodiment, the perspective transforms map all captured frames back into the reference frame $I_2$. In an alternate embodiment, another frame can be chosen as the reference frame.

To perform the perspective transforms, mapping points in each frame are first identified. In one embodiment, four mapping points are selected in each frame. To accurately correlate these points in the frames, the mapping points are uniquely identifiable for each frame; that is, a mapping point should not be redundant. Another desired attribute of these mapping points is that they be found in "feature-rich" areas; that is, areas of high detail. Once the mapping points are identified, then the perspective transforms of all frames can be accurately performed using standard techniques known in the art. To map frame $I_1$ to $I_2$, the mapping points are selected from a region $OV_{12}$ that roughly represents the overlap region between $I_1$ and $I_2$. The exact overlap region cannot be determined due to vibration of the cameras 12b and 12c. Similarly, to map $I_3$ to $I_2$, the mapping points are selected from a region $OV_{23}$ that roughly represent the overlap region between $I_2$ and $I_3$.

Figure 7:
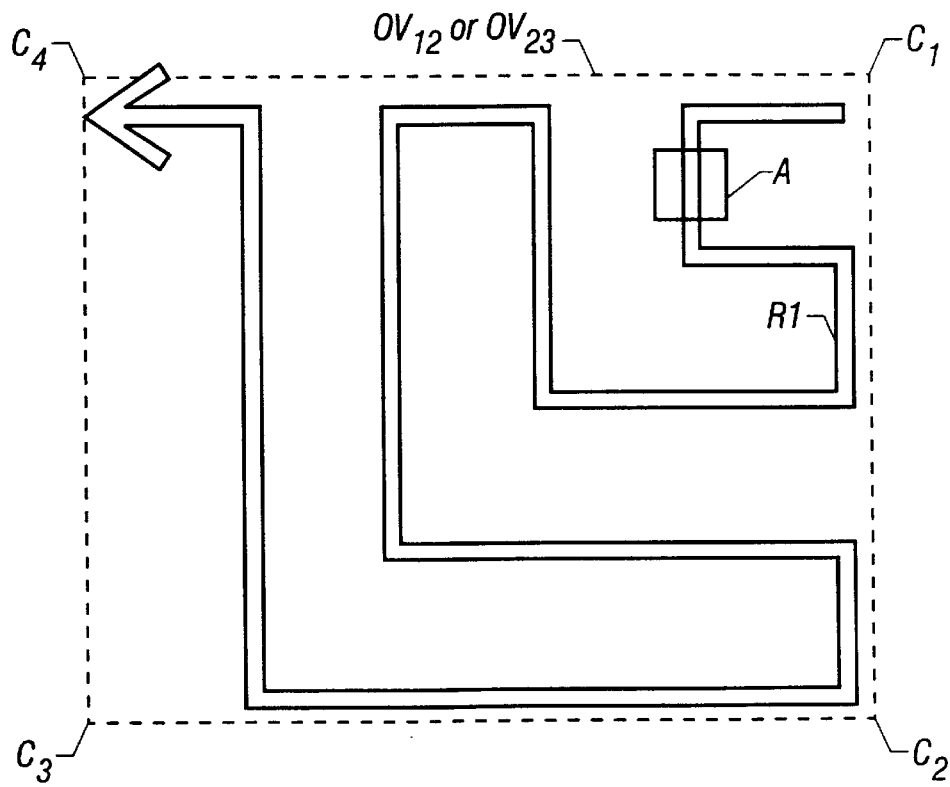
FIG. 7 illustrates a correlation path used by the image stitching process.

Referring to FIG. 7, the stitching program 16 according to an embodiment of the invention first receives a frame from a video source, such as the digital camera 12 (step 100). The stitching program 16 may next perform pre-processing steps, including lens distortion correction (step 106) and image simplification and enhancement (step 108). An image may be distorted through lens operations and other non-linear effects. Camera lenses often have geometric distortions, including "pin cushion" distortion and "barrel" distortion. Many standard techniques exist to compensate for such distortions.

After distortion of the image has been corrected, image simplification and enhancement may be performed (step 108). For example, processing may be performed to remove image noise. Further, luminance distortion may be corrected to improve the image correlation process. Luminance distortion is the effect of a camera lens in changing the relative brightness of different parts of an image, for example, making the center of an image brighter than it should be relative to the edges. To correct luminance distortion, a small number of images of blank white paper may be captured and the average taken on a pixel-by-pixel basis over the multiple images. The average image may be converted to a gray scale image $\{p_{ij}\}$, from which a gray scale histogram may be calculated. From the histogram, a threshold white value $w_T$ may be calculated such that a predetermined percentage (e.g., 92%) of pixels in the image $\{p_{ij}\}$ have white values less than $w_T$. From $w_T$ and $\{p_{ij}\}$, an array $\{c_{ij}\}$ is defined according to Eq. 1.

$$\{c_{ij}\} = \frac{w_T}{\{p_{ij}\}} \tag{Eq. 1}$$

To correct for luminance distortion, all captured frames that are to be stitched together may be multiplied by the array $\{c_{ij}\}$ on a pixel-by-pixel basis. Steps 106 and 108 are included in the pre-processing phase of the stitching process. In some embodiments, steps 106 and 108 may be eliminated to reduce processing requirements.

After the pre-processing phase, the alignment phase of the stitching process is performed to align the captured frames ($I_1$, $I_2$ and $I_3$) to compensate for the unknown relative positions of the multiple images. The stitching program 16 identifies "feature-rich" image areas (step 110) in the overlap region $OV_{12}$ or $OV_{23}$. In the image stitching process, "good" mapping points in an image are selected to properly map one image to another. Mapping points selected in one image are correlated to corresponding mapping points in another image. Poor choices in mapping points may result in missed correlation, resulting in incorrectly stitched images. As noted above, these mapping points are found in feature-rich areas. Thus, to select these mapping points, feature-rich areas are first identified. To determine what is a feature-rich area, the number of features in an image is first determined, followed by applying the measurement to find the feature-rich area.

To measure feature detail, a simplified edge detection scheme may be used in one embodiment. The measurement is defined as the summation of the absolute difference of a group of closely related pixels in both the x and y directions for a given correlation area, which is a small area (such as area A in FIG. 6) over which the feature-rich determination is made. For example, the correlation area A may be selected to be a region of 30×30 pixels. In one embodiment, a correlation area A is initially selected to be in a corner of the overlap region $OV_{12}$ or $OV_{23}$. If the initial correlation area is determined not to be feature-rich, then the correlation area A is moved according to a preselected path (e.g., path $R_1$ shown in FIG. 6) and the correlation process performed until a feature-rich area is identified.

The captured image is represented by a frame P and the parameters x and y represent the coordinates of pixels in the frame P. Thus, P(x, y) represents the pixel value at a certain (x, y) coordinate. To determine if the selected correlation area is a high-feature (or feature-rich) area, two variables H(x, y) and V(x, y) are defined according to Eqs. 2 and 3, in which H(x, y) represents the absolute horizontal pixel difference and V(x, y) represents the absolute vertical pixel difference.

$$H(x, y) = |P(x-1, y) - P(x+1, y)|, \tag{Eq. 2}$$

$$V(x, y) = |P(x, y-1) - P(x, y+1)|, \tag{Eq. 3}$$

From the H and V values, an edge detail value D of the correlation area may be calculated using Eq. 4, $$D = \sum_{i,j} H(i, j) + V(i, j), \tag{Eq. 4}$$

in which variables i, j are bounded by the selected correlation area.

By calculating the edge detail D, the number of features in a region may be measured. After the edge detail value D is calculated for the selected correlation area the stitching program 16 then determines if the edge detail value D exceeds the minimum feature threshold value (step 112). A feature-rich area is a region where the measured detail level is greater than the minimum feature (or detail threshold) for correlation to be successful. This minimum threshold value can be preset and depends on the sensitivity of the correlation routine to the type of features found in an image. Once this threshold value is determined, a simple search over the image can be done to find an area that meets the threshold requirement.

In one embodiment, the calculation of the detail value D may be improved by eliminating image noise from the calculation of D. This may allow for consistency of values across images of different quality. Noise reduction may be performed by eliminating pixel differences less than a certain threshold value. The noise threshold may be based upon the type of application and the type of images a camera can capture. For example, if the captured image includes text, the noise threshold may be set high to eliminate areas with luminance irregularity problems and poor image quality (low signal-to-noise ratios). To eliminate image noise, Eqs. 5 and 6 may be used.

$$H(x, y)=0, \text{ if } H(x, y) \leq N\text{Threshold}, \quad \text{(Eq. 5)}$$

$$V(x,y)=0, \text{ if } V(x,y) \leq N\text{Threshold}, \quad \text{(Eq. 6)}$$

where Nthreshold may be the minimum pixel difference between any two pixels, which also is the noise threshold.

Figure 6:
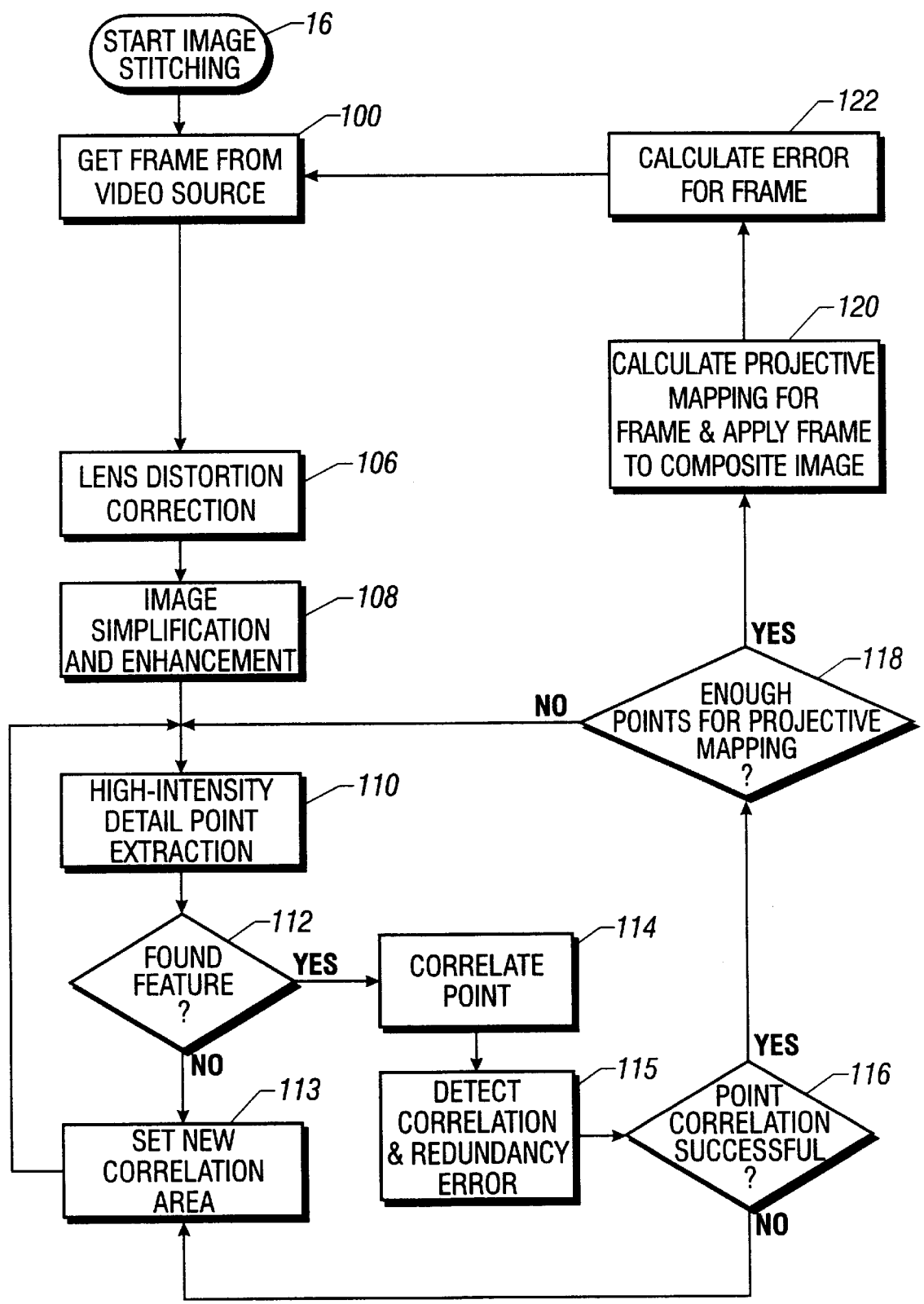
FIG. 6 is a flow diagram illustrating the application program of FIG. 5 that performs an image stitching process.

If the calculated detail value D is less than the minimum detail threshold (as determined in step 112), then a feature-rich area has not been found, and a new correlation area is selected along path $R_1$ or some variation of the path shown in FIG. 6 (step 113). The feature-rich area determination of steps 110 and 112 are then performed again. If the area is determined to be feature-rich, then a mapping point may be selected in the feature-rich area (step 114).

Most natural scenes have a high level of detail, so selecting a set of mapping points at fixed positions in the overlap region OV may be sufficient for correct correlation. However, in the case of low detail images, the detail within the captured image may be sparse. As a result, fixed point correlation may be unsuccessful. In some embodiments, fixed point correlation may be used, but other techniques for selecting mapping points may also be used such as that described below.

A mapping point is an area of an image that is uniquely identifiable from one image to another. According to one embodiment, the criteria for what constitutes a good set of mapping points and how to find those points are as follows: (1) points that have non-redundant feature-rich detail; and (2) points that are as far apart as possible in the overlap region $OV_{12}$ or $OV_{23}$. According to one embodiment, the zigzag or spiral-shaped search pattern $R_1$ shown in FIG. 6 may be used.

In one embodiment, search patterns identical to the search pattern $R_1$ may start from each of the other corners of the overlap region OV image to identify four mapping points. The pattern $R_1$ starts from corner $C_1$ of the overlap region OV, while the other patterns $R_2$, $R_3$, and $R_4$ would start from corners $C_2$, $C_3$, and $C_4$, respectively.

To select the mapping point in the selected correlation area, the current frame $P_k(x, y)$ is searched and compared to the same correlation area in a previously captured frame, $P_m(x, y)$. A correlation function $C(x, y)$ may be calculated according to Eq. 7, which is the sum of the squares of the pixel differences between $P_k(x, y)$ and $P_m(x, y)$.

$$C(x, y) = \sum_{i,j} [P_k(i, j) - P_m(i+x, j+y)]^2 \quad \text{(Eq. 7)}$$

where i, j are bounded by the selected correlation area. To find the correlation point, the correlation process identifies an (x, y) coordinate in the correlation area of the current frame $P_k(x,y)$ at which the correlation function $C(x, y)$ is a minimum. In effect, according to Eq. 7, an (x,y) coordinate is selected in the current frame $P_k$ and frame $P_k$ is moved with respect to the frame $P_m$ in the correlation area A to find a coordinate (x,y) that produces a minimum for $C(x,y)$.

Although in some embodiments the correlation function $C(x,y)$ of Eq. 7 may be used, other correlation functions are also contemplated from which a mapping point can be selected by calculating a minimum or maximum.

The technique described may provide several benefits. First, the search from the corners that follows the zigzag path of FIG. 6 in one embodiment minimizes the search time for finding adequate mapping points and yielding maximal transform area. Further, by utilizing feature-rich mapping points, white space or ambiguous regions of the image are automatically eliminated.

Once a mapping point is found, a correlation error and redundancy error check may be performed (block 115). Redundancy error is a result of selecting a correlation point on one image that could be mapped to several points on another image, thereby not producing a unique point. This may result from repetitive patterns in the images, which may include camera characteristics such as interlacing. To determine if redundant detail exists, correlation data is analyzed over the correlation area A. If this analysis indicates multiple minima of the same magnitude in correlation value, then redundancy has been detected. If the selected mapping point is a redundant mapping point, then it may be discarded as a mapping point.

Figure 8:
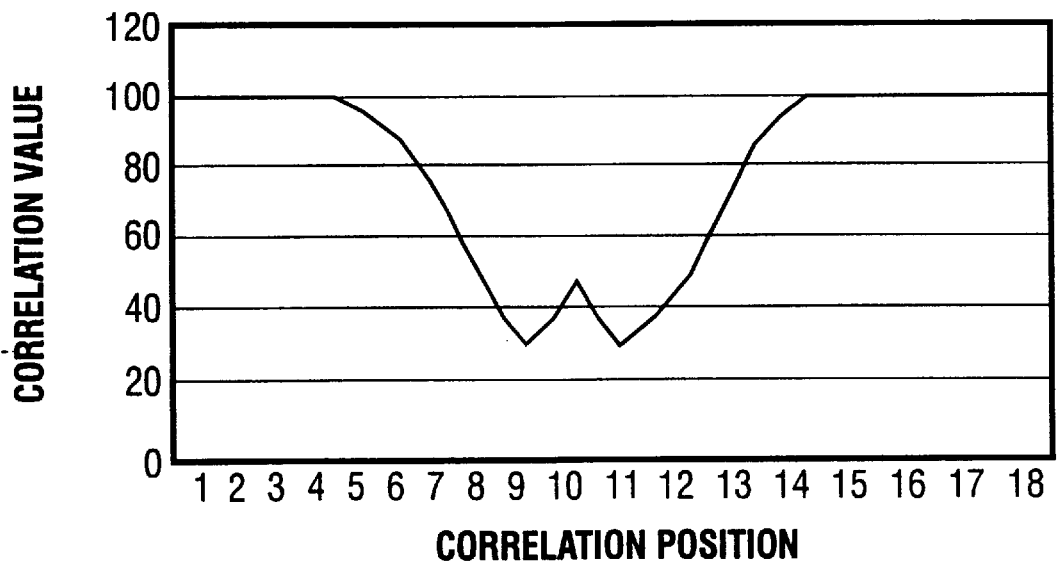
FIGS. 8 and 9 are charts of correlation function values calculated by comparing two images in the image stitching process.

The chart shown in FIG. 8 is a simplified chart of correlation illustrating the existence of redundant detail. Although the redundancy analysis involves a two-dimensional calculation, the one-dimensional correlation illustrated in the chart of FIG. 8 provides a simple illustration of how the redundancy error detection is performed. FIG. 8 shows the result of a horizontal search (in the x direction) in which redundant detail causes two minima when two images $P_k$ and $P_m$ are compared by calculating the correlation function $C(x, y)$ according to Eq. 12. The technique includes finding the minimum of the correlation function and setting a threshold that is slightly larger than the minimum value. The same concept and technique is extended to the two-dimensional case, in which a search is performed both in the x and y directions.

A method according to one embodiment for determining a threshold and number of minima includes selecting a predetermined threshold that is a set value (e.g. 33%) greater than the minimum value of $C(x, y)$ found in the correlation area A. If the threshold value used results in too many minima, then the threshold can be reduced until the number is manageable. Once a good set of minimum values is determined, the stitching program 16 may confirm if each is a minimum by searching all correlation points around it to make sure it is the lowest point in the area. If it is, then a true minimum has been found. If the number of true minima is greater than one per direction (x, y directions), then redundancy has been detected and the selected mapping point cannot be used.

Figure 9:
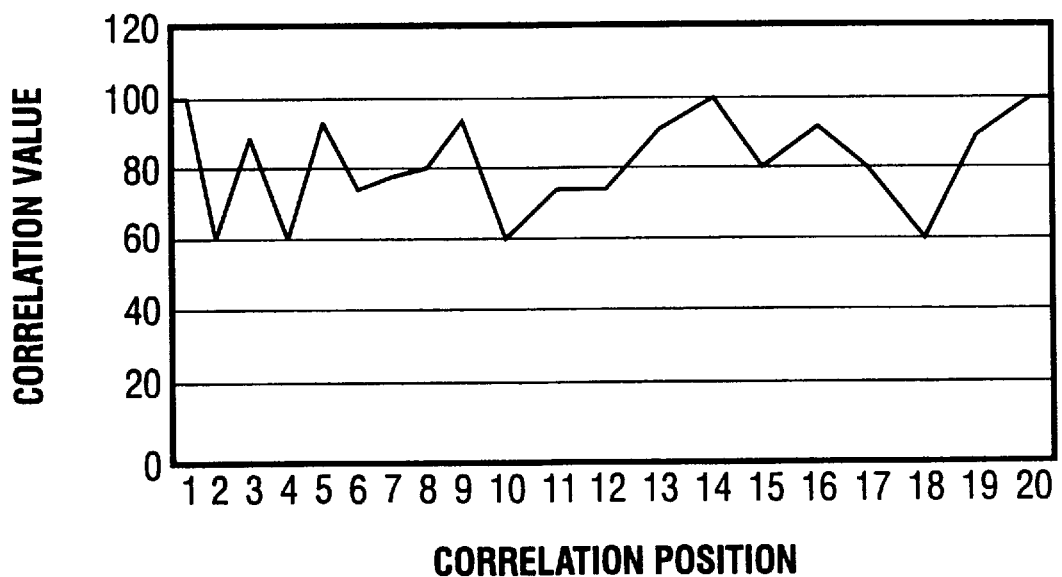

The stitching program 16 in block 115 may also check to determine if the correlation has failed. Correlation failure detection is similar to redundancy failure detection (x or y). If the correlation areas of two images are mismatched, there would be no discernable minimum, which may result in multiple, unequal minima. Thus, determining the number of minima found in the selected correlation area provides a way to validate if the correlation was successful or not. The chart shown in FIG. 9 illustrates what the correlation data could look like if the correlation was unsuccessful.

If the point correlation is unsuccessful due either to a detected redundancy error or a correlation error (block 116), then a new correlation area is selected (step 113) in the overlap region $OV_{12}$ or $OV_{23}$ to find a new mapping point (blocks 110, 112, 114, 115). However, if the point correlation is indicated as being successful (block 116), then the stitching program 16 determines if enough mapping points (e.g., 4) are selected to perform the perspective transform or projective mapping (block 118). If not, the process starts from another corner of the image to find another feature-rich area to find the next mapping point and to correlate the point (blocks 110, 112, 113, 114, 115, and 116).

Given a correlation point at $(x_M, y_M)$ that has been calculated by moving one image (e.g., $P_k$) over a second image (e.g., $P_m$), the stitching program 16 may optionally search for a sub-pixel position (a position located between two pixels) that provides even better correlation. The pixel located at $(x_M, y_M)$, which has a better correlation than its neighbors, may be referred to as the maximal pixel. Aligning the images at this pixel provides a better match then at any other pixel, but in general, alignment of the images $P_k$ and $P_m$ at a fractional pixel offset may provide better alignment.

To find this sub-pixel position, a 3×3 array of pixels defined by pixel positions $(x_L, x_M, x_R)$ and $(y_T, y_M, y_B)$ is identified. In the x direction $(x_L, x_M, x_R)$ represents the x-positions of the maximal pixel and its two neighbors. Similarly, $(y_T, y_M, y_B)$ represents the y-positions of the maximal pixel and its top and bottom neighbors. In the middle column of the 3×3 array, correlation values $C_T$, $C_M$, and $C_B$ are defined at positions $(x_M, y_T)$, $(x_M, y_M)$ and $(x_M, y_B)$, respectively. Similarly, in the middle row of the 3×3 array, correlation values $C_L$, $C_M$, and $C_R$ are defined at positions $(x_L, y_M)$, $(x_M, y_M)$, and $(x_R, y_M)$, respectively. Since $C_M$ is a minimum in the entire correlation area, it will have a value less than $C_L$, $C_R$, $C_T$, and $C_B$. Thus, to calculate a sub-pixel position that may provide better alignment than the $(x_M, y_M)$ position, the mapping point (x,y) may be modified according to Eqs. 8 and 9.

$$x = x_M + \frac{C_L - C_R}{2C_L - 4C_M + 2C_R}, \quad \text{(Eq. 8)}$$

$$y = y_M + \frac{C_B - C_T}{2C_B - 4C_M + 2C_T}, \quad \text{(Eq. 9)}$$

where x is computed from positions $(x_L, y_M)$, $(x_M, y_M)$ and $(x_R, y_M)$ by using the correlation values $(C_L, C_M$ and $C_R)$, while y is computed from position $(x_M, y_B)$, $(x_M, y_M)$, $(x_M, y_T)$ by using the correlation values $(C_B, C_M$ and $C_T)$. After the mapping points are selected, the perspective transform is performed (step 120). The current frame $P_k$ (representing either image $I_1$ or $I_3$) is mapped using the perspective transform back to a reference frame, which in some embodiments may be the image $I_2$.

In a perspective transform, the forward mapping function may be defined by Eqs. 10 and 11.

$$x = \frac{a_{11}u + a_{21}v + a_{31}}{a_{13}u + a_{23}v + a_{33}}, \text{ and} \quad \text{(Eq. 10)}$$

$$y = \frac{a_{12}u + a_{22}v + a_{32}}{a_{13}u + a_{23}v + a_{33}} \quad \text{(Eq. 11)}$$

where (x,y) is the coordinate of the current frame $P_k$; (u,v) is the coordinate of the reference frame $P_1$; and the nine coefficients $a_{ij}$(i=1–3, j=1–3) define a 3×3 matrix T that represents the transform.

$$T = \begin{bmatrix} a_{11} & a_{12} & a_{13} \\ a_{21} & a_{22} & a_{23} \\ a_{31} & a_{32} & a_{33} \end{bmatrix} \quad \text{(Eq. 12)}$$

Without loss of generality, the matrix T can be normalized so that the coefficient $a_{33}$ is set to unity ($a_{33}$=1). This leaves eight degrees of freedom for the projective mapping. The eight coefficients can be determined by establishing correspondence between four points in the reference frame $P_1$ and the current frame $P_k$. Let $(u_n, v_n)$ and $(x_n, y_n)$, for n=0, 1, 2, 3 be these four points in the $P_1$ and $P_k$ frames, respectively, and assuming $a_{33}$=1, Eqs. 10 and 11 will yield $$x = a_{11}u + a_{21}v + a_{31} - a_{13}ux - a_{23}vx, \quad \text{(Eq. 13)}$$

$$y = a_{12}u + a_{22}v + a_{32} - a_{13}uy - a_{23}vy, \quad \text{(Eq. 14)}$$

Applying these new x, y equations (13 and 14) to the four pairs of corresponding points in frames $P_1$ and $P_k$ yields an 8×8 system, as shown in Eq. 15.

$$X = \begin{bmatrix} u_0 & v_0 & 1 & 0 & 0 & 0 & -u_0x_0 & -v_0x_0 \\ u_1 & v_1 & 1 & 0 & 0 & 0 & -u_1x_1 & -v_1x_1 \\ u_2 & v_2 & 1 & 0 & 0 & 0 & -u_2x_2 & -v_2x_2 \\ u_3 & v_3 & 1 & 0 & 0 & 0 & -u_3x_3 & -v_3x_3 \\ 0 & 0 & 0 & u_0 & v_0 & 1 & -u_0y_0 & -v_0y_0 \\ 0 & 0 & 0 & u_1 & v_1 & 1 & -u_1y_1 & -v_1y_1 \\ 0 & 0 & 0 & u_2 & v_2 & 1 & -u_2y_2 & -v_2y_2 \\ 0 & 0 & 0 & u_3 & v_3 & 1 & -u_3y_3 & -v_3y_3 \end{bmatrix} B, \quad \text{(Eq. 15)}$$

where $A=[a_{11}\ a_{21}\ a_{31}\ a_{12}\ a_{22}\ a_{32}\ a_{13}\ a_{23}]$ are the unknown coefficients, an $X=[x_0\ x_1\ x_3\ y_0\ y_1\ y_2\ y_3]$ are the known coordinates of the selected mapping points in the current frame $P_k$. Once the coefficients $a_{ij}$(i=1–3, j=1–3) are determined, the matrix T is known and can be used to perform the mapping of the frame $P_k$ to the reference frame. The mapping performed using Eqs. 13 and 14 is done on a pixel-by-pixel basis.

At the kth frame, a set of k–1 transforms $T_j$(j=1, . . . , k–1) has been created to map the frame $P_k$ back to the coordinates of the reference frame. The transforms $T_j$(j–1, . . . , k–1) are multiplied together to form a resultant transform that is applied to $P_k$. The aligned frame $P_k$ is then added to the composite image using known techniques.

Next, for the given frame, the accumulated errors of the perspective transforms may be calculated and error correction performed in the error correction phase (block 122). The next frame is then retrieved and the frame processed (block 100).

Thus, the captured frame $P_1$ (representing image $I_1$) may be first mapped to the reference frame $P_2$ (representing Image $I_2$), and the two frames $P_1$ and $P_2$ may be combined into a composite image. Next, the captured frame $P_3$ (representing image $I_3$) may be mapped to $P_2$ and added to the composite image.

Any vehicles that are not within the field of view of the camera 12c may be identified. Their images may be caused to flash, in one example, to indicate the vehicle is along side the vehicle A. By subtracting the image from camera 12c from the composite image, a vehicle along side the vehicle A may be identified. Pattern recognition or another technique may be used to separate vehicles from stationary objects along the roadway.

Figure 10:
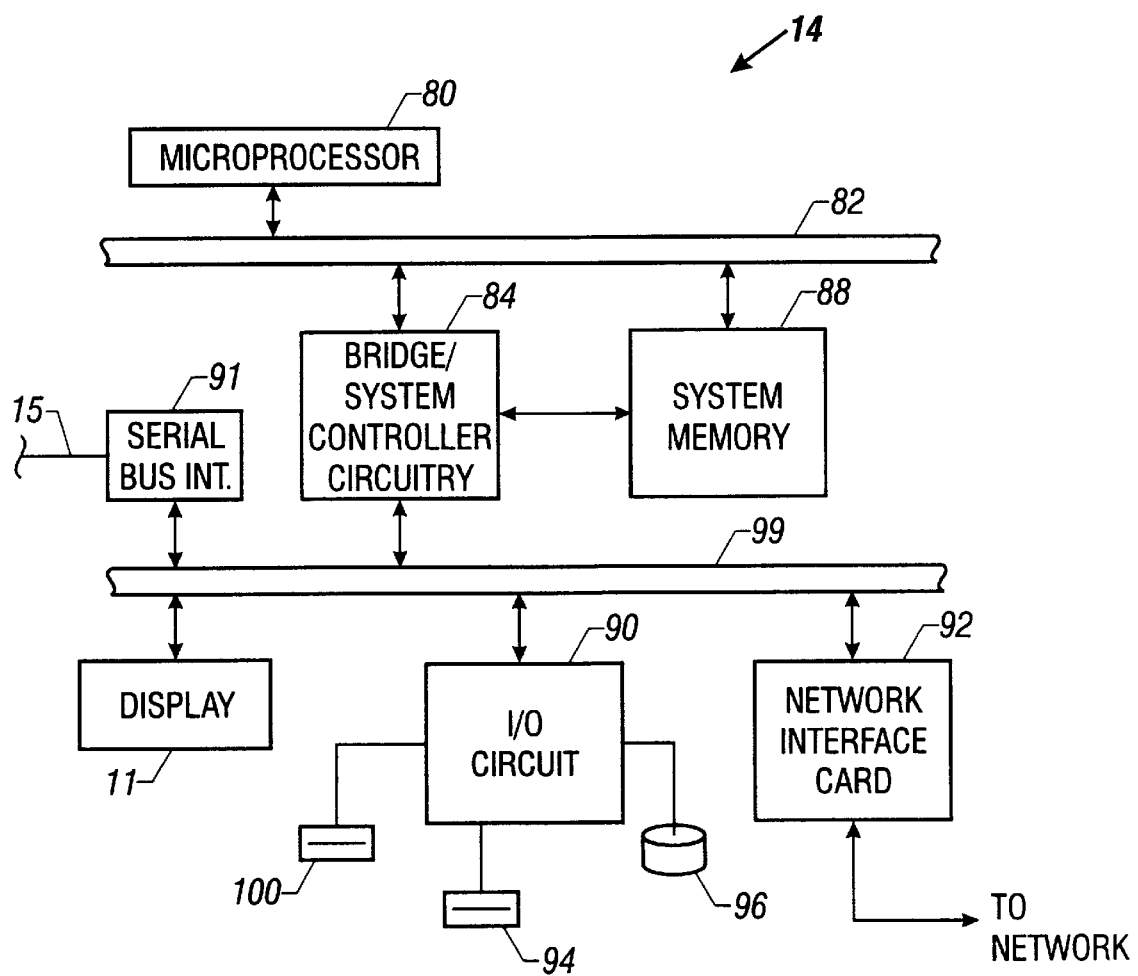
FIG. 10 is a block diagram of a computer system that may be used in the digital imaging system of FIG. 5 and in which stitching programs according to embodiments of the invention may be run.

Referring to FIG. 10, in some embodiments, the computer 14 may include a microprocessor 80 that runs the stitching program 16 according to embodiments of the invention. The system memory 88, the microprocessor 80, and the bridge/system controller circuitry 84 are all coupled to a host bus 82. The bridge circuitry 84 provides an interface from the host bus 82 to a downstream bus 99 that is coupled to an I/O controller 90 and a network interface card at 92, as examples. The computer 14 may also have, as examples, a CD-ROM or DVD-ROM drive 100, a floppy disk drive 94, and/or a hard disk drive 96 as well as the display 11.

According to some embodiments, the stitching program 16 may be stored on a suitable mass storage medium, such as the CD-ROM or DVD-ROM drive 100, the floppy disk drive 94, or the hard disk drive 96. During execution, the program 16 or portions of the program 16 may be loaded into the system memory 88 for execution by the microprocessor 80. In addition, the captured frames may be stored in one of the listed storage media or in the cameras 12, or alternatively, in an external location.

Figure 11:
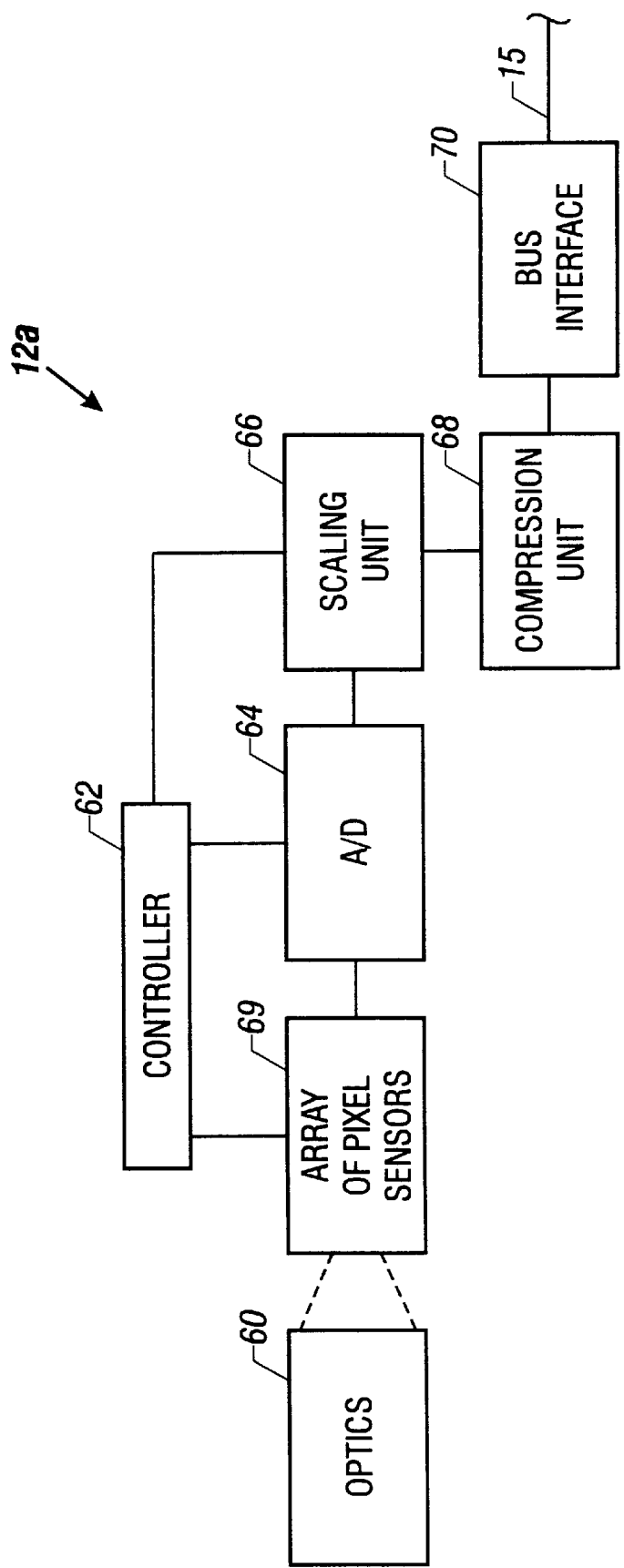
FIG. 11 is a block diagram of a digital camera that may be used in the digital imaging system of FIG. 5.

Referring to FIG. 11, the cameras 12, in some embodiments, include optical components 60 that focus an optical image to be captured onto an array of pixel sensors 69 (e.g., a CMOS pixel sensor array) which electrically captures the image. Under control of a controller 62, an analog-to-digital (A/D) converter 64 receives analog signals from the sensor array 69 and furnishes the signals to other components in the camera 12 for further processing. These other components may include a scaling unit 66 that scales the resolution of the captured frame, if desired, and a compression unit 66 to compress the size of the frame that is transmitted over the communication link 15 through a bus interface 70.

While the invention has been disclosed with respect to a limited number of embodiments, those skilled in the art will appreciate numerous modifications and variations therefrom. It is intended that the appended claims cover all such modifications and variations as fall within the spirit and scope of the invention.

What is claimed is:

1. A rearview system for a vehicle comprising:
   first and second imaging devices to develop images of an area to the rear of a vehicle, said imaging devices each having a viewing angle which overlaps with the viewing angle of the other of said imaging devices in an overlap area; and
   a system to combine the images from said first and second imaging devices together to form a composite image such that the images from said first and second imaging devices are aligned with respect to a reference frame to compensate for movement of said imaging devices so that the overlap area is not duplicated in said composite image and to correct for movement of said imaging devices.

2. The system of claim 1 including a display adapted to display said composite image.

3. The system of claim 1 including a third imaging device mounted on one side of the vehicle, said second imaging device mounted on the other side of the vehicle, and said first imaging device mounted on the rear of the vehicle, said system also adapted to combine the image from the third imaging device together with the images from the first and second imaging devices.

4. The system of claim 1 wherein the first imaging device has a viewing angle which overlaps the viewing angle of the second imaging devices.

5. The system of claim 3 wherein said first and second devices are arranged to capture an image of a different scene around a vehicle, said system adapted to combine said images so as to produce a composite image having a viewing angle greater than that of either of said imaging devices alone.

6. The system of claim 5 adapted to produce a composite image of the entire area behind and to either side of said vehicle.

7. A method comprising:
   receiving an image from a first vehicle mounted imaging device having a viewing angle which overlaps the viewing angle of a second vehicle mounted imaging device such that there is duplication between the images received from said first and second vehicle mounted imaging devices; and
   combining said images from said first and second devices together to form a composite image of a region to the rear of a vehicle without duplication arising from the overlap between said devices by aligning the images from said first and second devices so that the overlap area is not duplicated in said composite image and the effects of motion of said imaging devices is removed.

8. The method of claim 7 including displaying said composite image on a display available for viewing by an operator of a vehicle.

9. The method of claim 7 including receiving an image from a third imaging device and combining the image from said third imaging device together with the images from the first and second imaging devices.

10. The method of claim 7 including combining together images from said first and second devices to produce a composite image having a viewing angle greater than that of either of said imaging devices alone.

11. The method of claim 7 including producing a composite image of the entire area behind and to either side of a vehicle.

* * * * *